US006722141B2

(12) United States Patent
Ferris et al.

(10) Patent No.: US 6,722,141 B2
(45) Date of Patent: Apr. 20, 2004

(54) APPARATUS AND METHODS FOR PLACING AN ADDITIVE FLUID INTO A REFRIGERANT CIRCUIT

(75) Inventors: James E. Ferris, Richardson, TX (US); William J. Quest, Dallas, TX (US)

(73) Assignee: E.F. Products, Inc., Kaufman, TX (US)

( * ) Notice: Subject to any disclaimer, the term of this patent is extended or adjusted under 35 U.S.C. 154(b) by 221 days.

(21) Appl. No.: 10/190,764

(22) Filed: Jul. 8, 2002

(65) Prior Publication Data

US 2002/0174664 A1 Nov. 28, 2002

Related U.S. Application Data

(63) Continuation of application No. 09/802,178, filed on Mar. 8, 2001.

(51) Int. Cl.[7] ................................................ F25B 45/00
(52) U.S. Cl. ............................ 62/77; 62/292; 62/177; 62/73
(58) Field of Search ........................ 62/77, 292, 177, 62/73

(56) References Cited

U.S. PATENT DOCUMENTS

| | | | | |
|---|---|---|---|---|
| 3,785,163 A | * | 1/1974 | Wagner | 62/77 |
| 3,943,987 A | | 3/1976 | Rossi | |
| 3,976,110 A | * | 8/1976 | White | 141/346 |
| 4,110,998 A | * | 9/1978 | Owen | 62/125 |
| 4,535,802 A | * | 8/1985 | Robertson | 137/322 |
| 5,143,236 A | | 9/1992 | Gueret | |
| 5,167,140 A | * | 12/1992 | Cooper et al. | 73/40.7 |
| 5,540,254 A | * | 7/1996 | McGowan et al. | 137/315 |
| 5,827,050 A | * | 10/1998 | Price | 417/207 |
| 5,842,349 A | * | 12/1998 | Wakita et al. | 62/85 |
| 5,975,151 A | | 11/1999 | Packo | |
| 5,996,651 A | | 12/1999 | Scaringe | |
| 5,999,700 A | * | 12/1999 | Geers | 392/441 |
| 6,089,032 A | * | 7/2000 | Trachtenberg | 62/149 |
| 6,170,541 B1 | | 1/2001 | Sanhaji | |
| 6,183,663 B1 | * | 2/2001 | Kalley et al. | 252/68 |

OTHER PUBLICATIONS

International Search Report Application No.: PCT/US01/48875.

* cited by examiner

Primary Examiner—William C. Doerrler
Assistant Examiner—Mark S. Shulman
(74) Attorney, Agent, or Firm—Meyertons, Hood, Kivlin, Kowert & Goetzel, P.C.; Eric B. Meyertons

(57) ABSTRACT

A supply canister is partially filled with a refrigerant circuit additive liquid and is partially evacuated. Additive liquid from the canister may be placed into the refrigerant circuit of an air conditioning system by (1) connecting the canister to the circuit after it has been emptied and a vacuum pressure created therein, (2) connecting the canister to the refrigerant circuit suction line during system operation, or (3) connecting the canister to the suction line with the system off, to thereby force refrigerant from the circuit into the canister, and then starting the system to cause the vacuum pressure in the suction line to draw the contents of the canister into the refrigerant circuit.

18 Claims, 2 Drawing Sheets

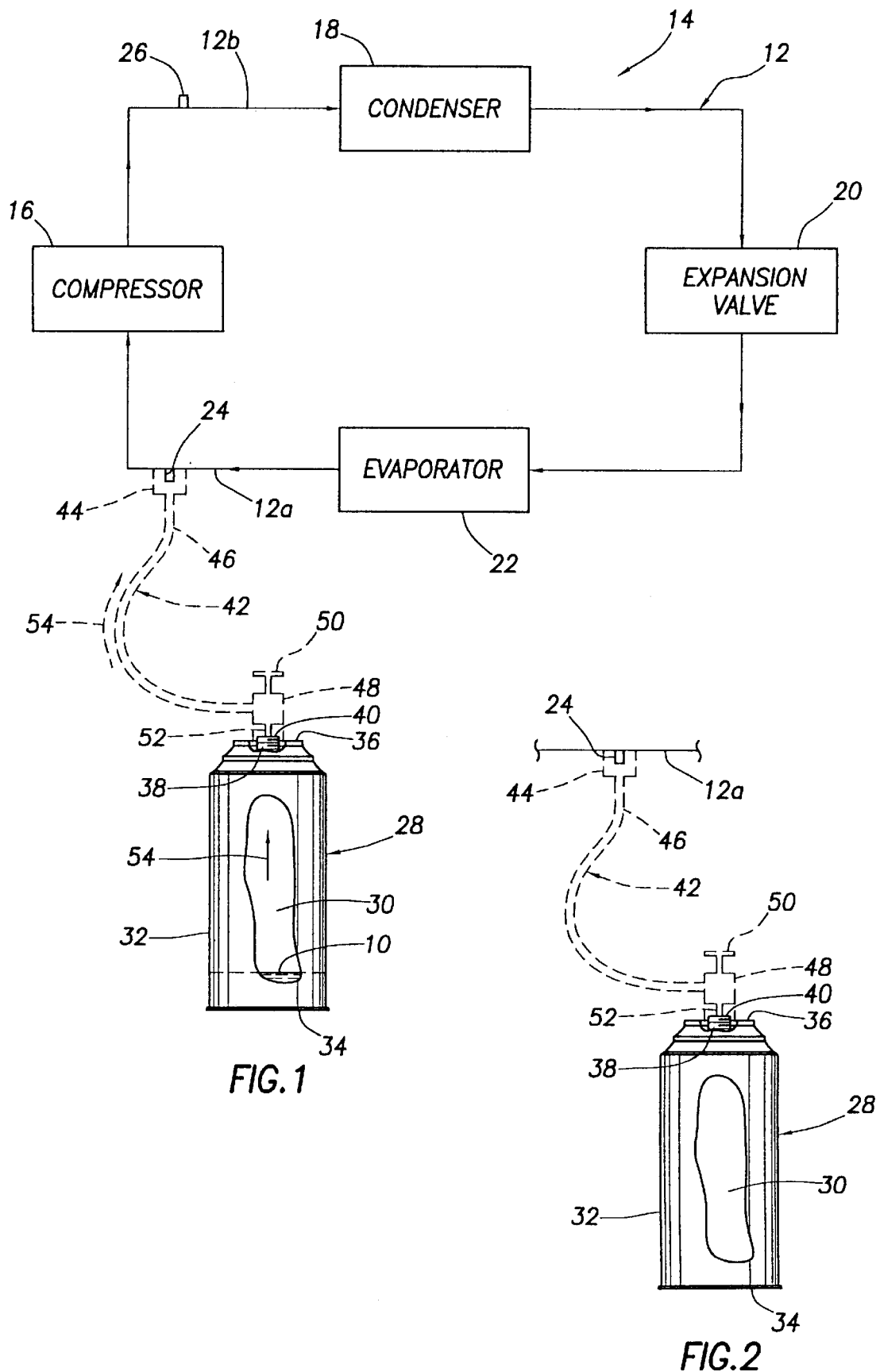

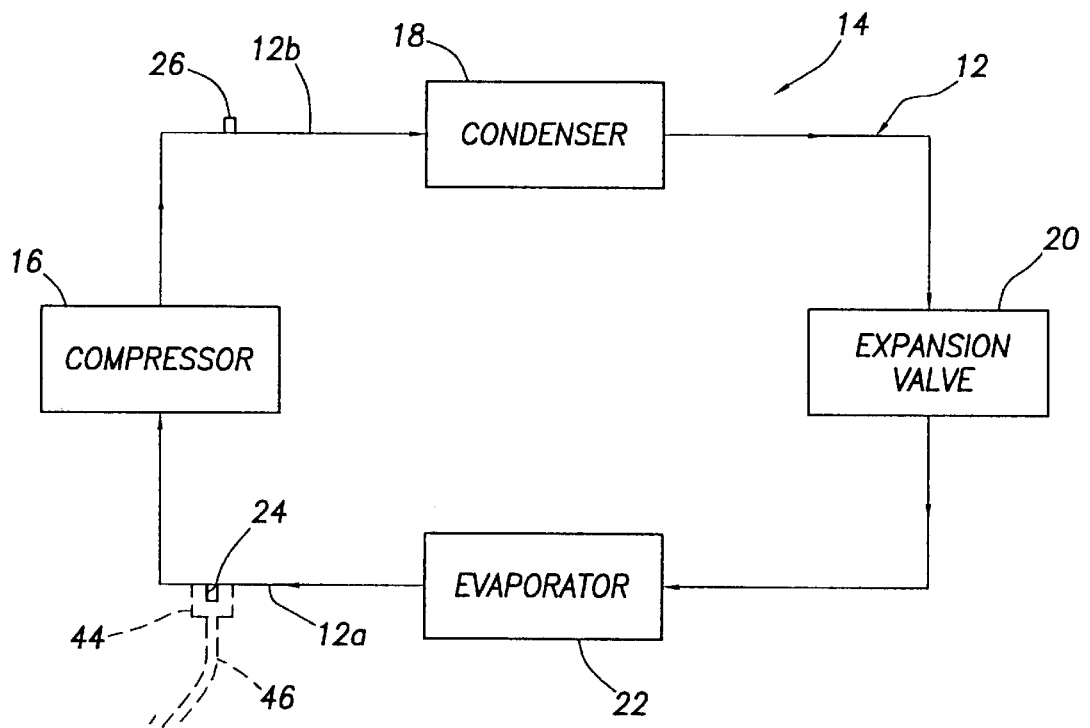
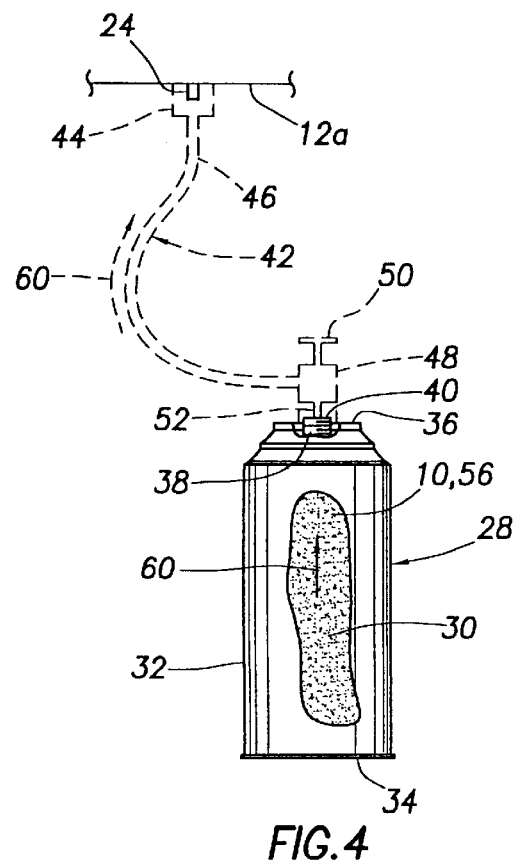
FIG.3
FIG.4

APPARATUS AND METHODS FOR PLACING AN ADDITIVE FLUID INTO A REFRIGERANT CIRCUIT

This is a continuation, of application Ser. No. 09/802,178, filed Mar. 8, 2001, such prior application being incorporated by reference herein in its entirety.

BACKGROUND OF THE INVENTION

The present invention generally relates to the maintenance of air conditioning or refrigeration systems and, in a preferred embodiment thereof, more particularly relates to apparatus and methods for placing an additive fluid into the refrigerant circuit of an air conditioning system.

In the typical air conditioning or refrigeration system it is often necessary to place an additive fluid (normally a liquid) into the refrigerant circuit portion of the system to maintain the performance of the system at a satisfactory level. Examples of additive fluids placed in refrigerant circuits include compressor oil, stop-leak liquid, acid neutralizers, drying agents, and ultraviolet colored leak-finder liquid.

Additive fluids of these and other types are conventionally placed in refrigerant circuits by one of four methods—namely, (1) the refrigerant circuit is opened, and an additive liquid is simply poured into the circuit; (2) the additive fluid is placed in a container along with pressurized refrigerant and is expelled with the pressurized refrigerant into the circuit; (3) the additive fluid is placed in an in-line storage device, and pressurized refrigerant is flowed through the storage device to force the additive fluid into the circuit along with the pressurized refrigerant; or (4) the additive fluid is injected into the circuit using a mechanical piston to force the fluid into the circuit.

These conventional techniques carry with them certain known problems, limitations and disadvantages. For example, to simply open the refrigerant circuit and pour the additive in can undesirably cause release of refrigerant to the atmosphere, and can also undesirably introduce contaminating air into the circuit. Packaging an additive fluid in a container with pressurized refrigerant to be forcibly injected into the circuit is also undesirable due the expense of adding refrigerant to the container as a propellant, the safety concerns inherent in a pressurized container structure, and the need to match the refrigerant propellant with the type of refrigerant within the circuit. Placing the additive fluid in an in-line device requires that the refrigerant forced through the device match the refrigerant in the circuit to avoid contamination of the circuit. Injecting additive fluid into a refrigerant circuit using a mechanical piston device tends to be a somewhat cumbersome task requiring specialized packaging and/or equipment.

As can readily be seen from the foregoing, a need exists for improved apparatus and methods for placing an additive fluid into a refrigerant circuit. It is to this need that the present invention is directed.

SUMMARY OF THE INVENTION

In carrying out principles of the present invention, in accordance with a preferred embodiment thereof, a specially designed vessel or canister is provided for use in placing an additive fluid, representatively an additive liquid, into the refrigerant circuit of an air conditioning or refrigeration system, representatively an automotive air conditioning system. In a preferred embodiment thereof, the vessel has an interior communicatable with a suction line portion of the refrigerant circuit, the vessel interior being partially filled with an additive liquid, being partially evacuated to a vacuum pressure less than that of the suction line portion during operation of the air conditioning system, and being substantially devoid of refrigerant.

According to a first method of utilizing the partially evacuated vessel, the interior of the vessel is initially communicated with the interior of the suction line portion during operation of the air conditioning system, representatively using a refrigerant recharge hose assembly, whereupon the greater vacuum pressure in the suction line portion of the refrigerant circuit draws the additive liquid into the suction line portion.

According to a second method of utilizing the partially evacuated vessel, the refrigerant circuit is emptied and a vacuum pressure is created therein which is greater than the vacuum pressure within the vessel. The vessel is then communicated with the interior of the refrigerant circuit, representatively using a refrigerant recharge hose assembly, whereupon the greater vacuum pressure within the emptied refrigerant circuit draws the additive fluid into the refrigerant circuit.

According to a third method of utilizing the partially evacuated vessel, the interior of the vessel is initially communicated with the interior of the suction line portion, representatively using a refrigerant recharge hose assembly, while the air conditioning system is turned off and a positive pressure exists in the interior of the suction line portion. The positive pressure within the suction line portion forces refrigerant therefrom into the vessel, thereby positively pressurizing its interior. Next, the air conditioning system is turned on to create a negative pressure within the suction line portion, thereby drawing the refrigerant and additive liquid from the positively pressurized canister interior into the suction line portion.

The provision and use of the specially designed partially evacuated vessel provides a variety of advantages over conventional pressurized canisters containing refrigerant and liquid additive. For example, since there is no refrigerant in the vessel, the same additive liquid-containing vessel can be used with a wide variety of air conditioning or refrigeration systems that utilize different types of refrigerants—the vessel does not have to be "matched" to a particular type of refrigerant in a circuit in order to avoid contamination thereof by a different type of refrigerant within the vessel.

Moreover, since refrigerant is not packaged within the vessel, the material cost of the partially filled vessel is substantially reduced. Additionally, since there is no refrigerant disposed within the as-manufactured vessel it cannot leak refrigerant into the atmosphere, and the lack of pressurized refrigerant within the as-manufactured vessel renders it safer to ship and store.

BRIEF DESCRIPTION OF THE DRAWINGS

FIG. 1 is a schematic diagram of a representative air conditioning system into the refrigerant circuit portion of which an additive fluid is being placed using a specially designed, partially evacuated additive fluid canister embodying principles of the present invention;

FIG. 2 schematically illustrates the canister after its additive fluid has been placed into the refrigerant circuit, with FIGS. 1 and 2 together illustrating first and second methods of placing an additive fluid into the refrigerant circuit; and FIGS. 3 and 4 are schematic diagrams similar to those in FIGS. 1 and 2 and together illustrate a third method of placing an additive fluid into a refrigerant circuit using the partially evacuated additive fluid canister.

DETAILED DESCRIPTION

Schematically depicted in FIGS. 1 and 2 are first and second methods of placing an additive fluid 10 in the refrigerant circuit 12 of an air conditioning or refrigeration system which is representatively an automotive air conditioning system 14. The additive fluid 10 is representatively an additive liquid such as, for example, compressor oil, a stop-leak liquid, an ultraviolet colored leak-finder liquid, an acid neutralizer, or a drying agent.

The air conditioning system 14 is representatively of the direct expansion type and comprises the usual compressor 16, condenser 18, expansion valve 20 and evaporator 22 connected as shown in the refrigerant circuit 12. Compressor 16 is disposed between suction and liquid line portions 12a,12b of the circuit 12, with suction line portion 12a having a low side pressure tap or service fitting 24 installed therein, and liquid line portion 12b having a high side pressure tap or service fitting 26 installed therein. During operation of the system 14, refrigerant is flowed through the circuit 12 in the direction indicated by the circuit flow arrows in FIG. 1.

According to a key feature of the present invention, a specially designed vessel or canister 28 (see FIG. 1) is partially filled with the additive liquid 10 and is partially evacuated to a vacuum pressure suitable for the air conditioning system with which the canister 28 is to be used (representatively in the range of from about 12" to about 15" Hg vacuum for an automotive air conditioning system refrigerant circuit) which is (1) less than the vacuum pressure within the refrigerant circuit suction line portion 12a (typically in the range of from about 20" to about 30" Hg vacuum for an automotive air conditioning system refrigerant circuit) during operation of the air conditioning system 14 with refrigerant operatively flowing through the circuit 12, and (2) less than the positive pressure within the suction line portion 12a (for example, about 78.4 psig when the ambient temperature is 75 degrees F.) when the air conditioning system 14 is not operating, and refrigerant is not being flowed through the circuit 12.

As schematically depicted in FIG. 1, the partially evacuated interior 30 of the canister 28, as originally fabricated, contains only the additive liquid 10 and is devoid of refrigerant material. The canister 28 thus differs in two primary regards from conventional additive injection canisters— namely, (1) it does not contain refrigerant, and (2) its interior is at a substantial negative pressure as opposed to being highly pressurized. Canister 28 is of a suitable metal material and has a hollow cylindrical body 32 with a lower end 34 and an upper end 36 having an externally threaded tubular projection 38 thereon, the projection 38 having a closed upper end 40.

Representatively, the refrigerant circuit 12 schematically depicted in FIG. 1 is filled with R134a refrigerant, with the suction line service fitting 24 being of a different configuration than that of the liquid line service fitting 26. However, the principles of the present invention are not limited in any manner to an R134a refrigerant circuit. TO place the additive liquid 10 into the refrigerant circuit 12 using a first method of the present invention, the interior 30 of the canister 28 (see FIG. 1) is communicated with the interior of the refrigerant circuit suction line portion 12a, during operation of the air conditioning system 14 and flow of refrigerant through the circuit 12, using a conventional R134a refrigerant recharge hose assembly 42 which is illustrated in phantom for purposes of illustrative clarity.

Recharge hose assembly 42 includes a quick disconnect fitting 44 (or another type of connection fitting such as a threaded fitting) interconnected by a length of refrigerant charging hose 46 to an internally threaded tapping/dispensing valve 48 having a rotatable handle 50 useable to axially drive a piercing stem portion 52 of the valve 48. To ready the canister 28 for use in placing the additive liquid 10 into the refrigerant circuit 12, the tapping/dispensing valve 48 (with its piercing stem 52 in an upwardly retracted position) is threaded onto the tubular projection 38 of the canister 28, and the quick disconnect fitting 44 is connected to the suction line service port 24.

With the air conditioning system 14 running, and refrigerant being operatively flowed through the suction line portion 12a at a vacuum pressure greater than that in the partially evacuated canister interior 30, the tapping/dispensing valve handle 50 is operated to pierce the upper end 40 of the canister projection 38 and place the canister interior 30 in communication with the interior of the suction line portion 12a. As indicated by the arrows 54 in FIG. 1, the higher vacuum pressure in the suction line portion 12a draws the additive liquid 10 from the partially evacuated canister interior 30 into the suction line portion 12a, thereby emptying the canister 30 of its additive liquid content as shown in FIG. 2.

This higher vacuum pressure emptying of the canister 28 may be facilitated by inverting the canister 28 and holding it higher than the suction line service fitting 24. After the additive liquid 10 is placed into the refrigerant circuit in this manner, the refrigerant recharge hose assembly 42 is disconnected from the service fitting 24 and the canister 28 and the now emptied canister 28 discarded.

With continued reference to FIGS. 1 and 2, a second method of utilizing the specially designed, partially evacuated canister 28 to place its additive liquid 10 into the refrigerant circuit 12 is to communicate the interior 30 of the canister 28 with the interior of the refrigerant circuit (e.g., at its suction line portion 12a), using the hose assembly 42, while the refrigerant circuit 12 has been emptied for repair and has a service vacuum pressure maintained therein which is greater than the vacuum pressure within the interior 30 of the canister 28. The service vacuum pressure within the refrigerant circuit 12 pulls the additive liquid 10 from the canister interior 30 into the refrigerant circuit 12 as indicated by the arrows 54 in FIG. 1.

A third method of utilizing the specially designed, partially evacuated canister 28 to place its additive liquid 10 into the refrigerant circuit 12 is schematically illustrated in FIGS. 3 and 4 to which reference is now made. Utilizing this second method, with the air conditioning system 14 initially being turned off, so that refrigerant is not being flowed through the circuit 12 and a positive pressure is present in the interior of the suction line portion 12a, the partially evacuated canister 28 is interconnected via the hose assembly 42 to the suction line service fitting 24, with the tapping/dispensing valve 48 being in its closed position, as previously described. The valve handle 50 is then rotated to axially drive the stem 52, pierce the canister projection 38, and initially communicate the partially evacuated canister interior 30 with the positively pressurized refrigerant within the suction line portion 12a.

As depicted in FIG. 3, this causes positively pressurized refrigerant 56 from within the interior off the suction line portion 12a to be forcibly flowed into the partially evacuated canister interior 30 via the hose 46, as indicated by the arrows 58 in FIG. 3, to become in effect a carrier for the additive liquid 10. Next, the air conditioning system 14 is turned on to create an operative flow of refrigerant 56 through the circuit 12 and generate in the suction line portion 12a a vacuum pressure. The positive pressure previously created in the interior 30 of the canister 28 by the forcible injection of refrigerant 56 thereinto causes the liquid additive and refrigerant 10,56 within the canister interior 30 to be flowed into the suction line portion 12a, via the hose 46, as indicated by the arrows 60 in FIG. 4, thereby substantially emptying the canister 28 of its refrigerant and additive contents. This transfer of refrigerant and additive to the circuit 12 may be facilitated by inverting the canister 28 and positioning it at a higher level than that of the suction line service fitting 24. After such transfer is completed, the refrigerant recharge hose assembly 42 is disconnected from the canister 28 and the service fitting 24, and the emptied canister 28 discarded.

The provision and use of the specially designed partially evacuated canister 28 provides a variety of advantages over conventional pressurized canisters containing refrigerant and liquid additive. For example, since there is no refrigerant in the canister, the same canister can be used with a wide variety of air conditioning or refrigeration systems that utilize different types of refrigerants—the canister does not have to be "matched" to a particular type of refrigerant in a circuit in order to avoid contamination thereof by a different type of refrigerant within the canister.

Moreover, since refrigerant is not packaged within the canister, the material cost of the partially filled canister is substantially reduced. Additionally, since there is no refrigerant disposed within the as-manufactured canister it cannot leak refrigerant into the atmosphere, and the lack of pressurized refrigerant within the as-manufactured canister renders it safer to ship and store.

The foregoing detailed description is to be clearly understood as being given by way of illustration and example only, the spirit and scope of the present invention being limited solely by the appended claims.

What is claimed is:

1. Apparatus for use in placing an additive fluid into a refrigerant circuit, said apparatus comprising a fluid-containing vessel structure which, prior to its first use, has a partially evacuated interior communicatable with the refrigerant circuit and being partially filled with an additive fluid, said fluid-containing vessel structure having an internal vacuum pressure within the range of from about 12" Hg to about 15" Hg.

2. The apparatus of claim 1 wherein said interior is substantially devoid of refrigerant.

3. The apparatus of claim 1 wherein:
the refrigerant circuit includes a suction line portion having, during operative flow of refrigerant therethrough, a first vacuum pressure, and
the interior vacuum pressure of said fluid-containing vessel structure is less than said first vacuum pressure.

4. The apparatus of claim 1 wherein:
said fluid-containing vessel structure is partially filled with an additive liquid.

5. Apparatus for use in placing an additive fluid into a refrigerant circuit including a suction line portion having, during operative flow of refrigerant therethrough, a first vacuum pressure, said apparatus comprising a fluid-containing vessel structure which, prior to its first use, has an interior communicatable with the suction line portion, being partially filled with an additive fluid, being evacuated to a second vacuum pressure less than said first vacuum pressure, and being substantially devoid of refrigerant, said second vacuum pressure being in the range of from about 12" Hg to about 15" Hg.

6. The apparatus of claim 5 wherein said fluid-containing vessel structure is partially filled with an additive liquid.

7. A method of placing an additive fluid into a refrigerant circuit, said method comprising the steps of:
providing a fluid-containing vessel structure having an interior partially filled with an additive fluid and having a vacuum pressure in the range of from about 12" Hg to about 15" Hg; and
communicating the refrigerant circuit with said partially evacuated interior of said fluid-containing vessel structure.

8. The method of claim 7 wherein said providing step is performed using a fluid-containing vessel structure with an interior substantially devoid of refrigerant.

9. The method of claim 7 wherein said providing step is performed using a fluid-containing vessel structure partially filled with an additive liquid.

10. The method of claim 7 wherein said communicating step is performed by operatively interconnecting a refrigerant recharge hose assembly between said fluid-containing vessel structure and said refrigerant circuit.

11. The method of claim 7 wherein:
said refrigerant circuit includes a suction line portion which, during operative flow of refrigerant therethrough, has a vacuum pressure greater than the vacuum pressure within said fluid-containing vessel structure, and
said communicating step includes the step of communicating said partially evacuated interior of said fluid-containing vessel structure with the interior of said suction line portion, during operative flow of refrigerant therethrough, in a manner flowing said additive fluid into said suction line portion.

12. The method of claim 7 wherein:
said refrigerant circuit has a suction line portion,
said suction line portion, during operative flow of refrigerant therethrough, having a vacuum pressure greater than the vacuum pressure within said fluid-containing vessel structure,
said suction line portion, in the absence of an operative flow of refrigerant flow therethrough, having a positive pressure,
said communicating step is performed by communicating said partially evacuated interior of said fluid-containing vessel structure with the interior of said suction line portion, during an absence of operative refrigerant flow therethrough, to thereby force refrigerant from said refrigerant circuit into said fluid-containing vessel structure, and
said method further comprises the step, performed after said communicating step, of creating an operative flow of refrigerant through said suction line portion to thereby draw refrigerant and additive fluid into said refrigerant circuit from within said fluid-containing vessel structure.

13. A method of placing an additive fluid into a refrigerant circuit, said method comprising the steps of:
providing a fluid-containing vessel structure having a partially evacuated interior partially filled with an additive fluid; and
communicating the refrigerant circuit with said partially evacuated interior of said fluid-containing vessel structure, said method further comprising the steps, performed prior to said communicating step, of emptying said refrigerant circuit and creating in the emptied refrigerant circuit a vacuum pressure greater than the vacuum pressure within said partially evacuated interior of said fluid-containing vessel structure.

14. A method of placing an additive liquid into a refrigerant circuit, said method comprising the steps of:

providing a fluid-containing vessel structure which, prior to its first use, has a partially evacuated interior partially filled with an additive liquid and being substantially devoid of refrigerant, the interior having a vacuum pressure in the range of from about 12" Hg to about 15" Hg; and communicating the interior of said refrigerant circuit with said partially evacuated interior of said fluid-containing vessel structure.

15. The method of claim 14 said communicating step is performed by operatively interconnecting a refrigerant recharge hose assembly between said fluid-containing vessel structure and said suction line portion.

16. The method of claim 14 wherein:

said refrigerant circuit has a suction line portion which, during operative flow of refrigerant flow therethrough, has a vacuum pressure greater than the vacuum pressure within said fluid-containing vessel structure, and said communicating step is performed by communicating the interior of said suction line portion with said partially evacuated interior of said fluid-containing vessel structure during operative flow of refrigerant through said suction line portion.

17. The method of claim 14 wherein:

said refrigerant circuit has a suction line portion which, during operative flow of refrigerant therethrough, has a vacuum pressure greater than the vacuum pressure within said fluid-containing vessel structure, said suction line portion, in the absence of an operative flow Of refrigerant flow therethrough, has a positive pressure, said communicating step is performed by communicating said partially evacuated interior of said fluid-containing vessel structure with the interior of said suction line portion, during an absence of operative refrigerant flow therethrough, to thereby force refrigerant from said refrigerant circuit into said fluid-containing vessel structure, and said method further comprises the step, performed after said communicating step, of creating an operative flow of refrigerant through said suction line portion to thereby draw refrigerant and additive fluid into said refrigerant circuit from within said fluid-containing vessel structure.

18. A method of placing an additive liquid into a refrigerant circuit, said method comprising the steps of:

providing a fluid-containing vessel structure which, prior to its first use, has a partially evacuated interior partially filled with an additive liquid and being substantially devoid of refrigerant, and communicating the interior of said refrigerant circuit with said partially evacuated interior of said fluid-containing vessel structure, said method further comprising the steps, performed prior to said communicating step, of emptying said refrigerant circuit and creating in the emptied refrigerant circuit a vacuum pressure greater than the vacuum pressure within said partially evacuated interior of said fluid-containing vessel structure.

* * * * *